(12) United States Patent
Oikawa et al.

(10) Patent No.: US 10,960,651 B2
(45) Date of Patent: Mar. 30, 2021

(54) LAMINATE, WAVELENGTH CONVERSION MEMBER, BACKLIGHT UNIT, AND IMAGE DISPLAY DEVICE

(71) Applicant: Hitachi Chemical Company, Ltd., Tokyo (JP)

(72) Inventors: Futoshi Oikawa, Tokyo (JP); Masashi Takahashi, Tokyo (JP); Tomomi Kawamura, Tokyo (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 0 days.

(21) Appl. No.: 16/957,660

(22) PCT Filed: Dec. 28, 2017

(86) PCT No.: PCT/JP2017/047377
§ 371 (c)(1),
(2) Date: Jun. 24, 2020

(87) PCT Pub. No.: WO2019/130582
PCT Pub. Date: Jul. 4, 2019

(65) Prior Publication Data
US 2020/0331244 A1    Oct. 22, 2020

(51) Int. Cl.
*F21V 21/00* (2006.01)
*B32B 27/08* (2006.01)
(Continued)

(52) U.S. Cl.
CPC .............. *B32B 27/08* (2013.01); *B32B 27/36* (2013.01); *C08F 220/40* (2013.01); *C08G 75/02* (2013.01);
(Continued)

(58) Field of Classification Search
CPC ..... B32B 27/08; B32B 27/36; B32B 2255/10; B32B 2255/26; B32B 2307/7244;
(Continued)

(56) References Cited

U.S. PATENT DOCUMENTS

2014/0076397 A1* 3/2014 Wagenblast .......... H01L 31/055
136/257
2015/0346579 A1* 12/2015 Hsieh .................... H04N 9/3114
362/84

(Continued)

FOREIGN PATENT DOCUMENTS

CN      107107574 A     8/2017
EP         2674293 A2    12/2013
(Continued)

OTHER PUBLICATIONS

Decision to Grant a Patent in Japanese Application JP 2019-562704, dated Jun. 1, 2020, together with English language machine translation.

(Continued)

*Primary Examiner* — Laura K Tso
(74) *Attorney, Agent, or Firm* — Fitch, Even, Tabin & Flannery, L.L.P.

(57) ABSTRACT

A laminate, comprising an intermediate layer and a covering material A and a covering material B that are disposed on respective sides of the intermediate layer, the covering material A being disposed with an orientation direction at an angle of 20° or less with respect to an orientation direction of the covering material B.

13 Claims, 2 Drawing Sheets

(51) Int. Cl.
*B32B 27/36* (2006.01)
*C08F 220/40* (2006.01)
*C08G 75/02* (2016.01)
*F21V 8/00* (2006.01)

(52) U.S. Cl.
CPC .......... *G02B 6/005* (2013.01); *B32B 2255/10* (2013.01); *B32B 2255/26* (2013.01); *B32B 2307/7244* (2013.01); *B32B 2307/7246* (2013.01); *B32B 2457/20* (2013.01); *G02B 6/0051* (2013.01); *G02B 6/0055* (2013.01)

(58) Field of Classification Search
CPC ......... B32B 2307/7246; B32B 2457/20; C08F 220/40; G02B 6/005; G02B 6/0051; G02B 6/0055; C08G 75/02
USPC .......................................................... 362/84
See application file for complete search history.

(56) References Cited

U.S. PATENT DOCUMENTS

2016/0327690 A1* 11/2016 Tokinoya ............... G02B 6/005
2016/0327719 A1* 11/2016 Kitahara ................ G02B 6/005
2017/0248809 A1  8/2017 Oba et al.

FOREIGN PATENT DOCUMENTS

| | | |
|---|---|---|
| JP | H02-172732 A | 7/1990 |
| JP | 2000-242760 A | 9/2000 |
| JP | 2013-544018 A | 12/2013 |
| JP | 2016-95426 A | 5/2016 |
| JP | 2017-68069 A | 4/2017 |
| JP | 2017-142360 A | 8/2017 |
| WO | 2016/052625 A1 | 4/2016 |
| WO | 2017/043483 A1 | 3/2017 |
| WO | 2017/086319 A1 | 5/2017 |

OTHER PUBLICATIONS

Written Amendment in Japanese Application JP 2019-562704, dated Apr. 30, 2020, together with English language machine translation.
Written Opinion in Japanese Application JP 2019-562704, dated Apr. 30, 2020, together with English language machine translation.
Notice of Reasons for Refusal in Japanese Application JP 2019-562704, dated Mar. 26, 2020, together with English language machine translation.

* cited by examiner

[FIG. 1]
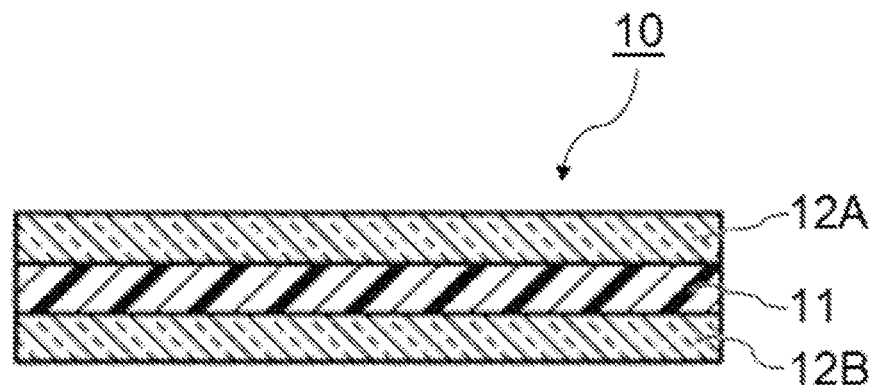
[FIG. 2]
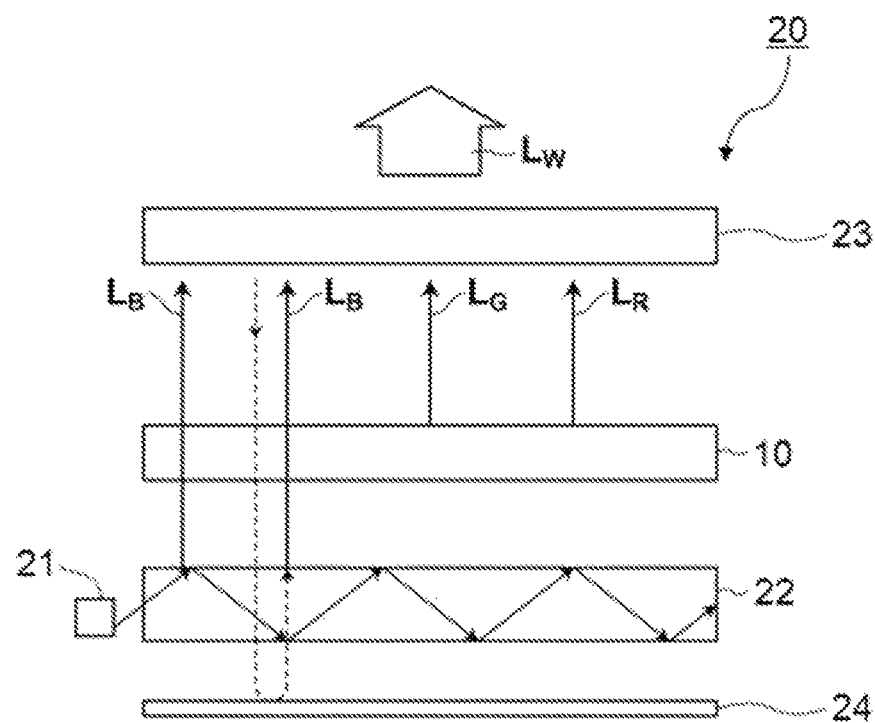

[FIG. 3]
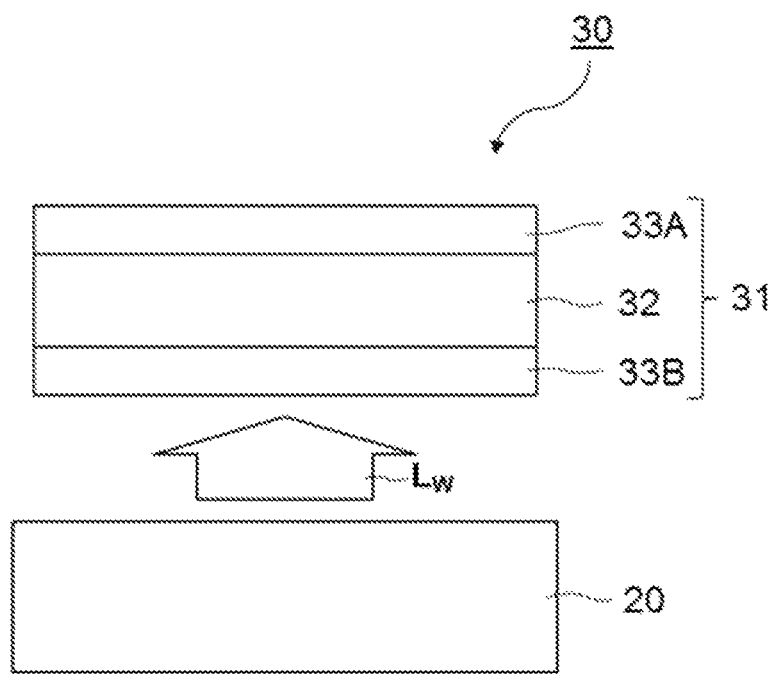

LAMINATE, WAVELENGTH CONVERSION MEMBER, BACKLIGHT UNIT, AND IMAGE DISPLAY DEVICE

CROSS-REFERENCE TO RELATED APPLICATIONS

This application is a U.S. national phase application filed under 35 U.S.C. § 371 of International Application No. PCT/JP2017/047377, filed Dec. 28, 2017, designating the United States, the entire contents of which are hereby incorporated herein by reference.

TECHNICAL FIELD

The invention relates to a laminate, a wavelength conversion member, a backlight unit, and an image display device.

BACKGROUND ART

A laminate having covering materials such as resin sheets, on respective sides of an intermediate layer, is used in various technical fields. For example, a wavelength conversion member having a layer including a quantum dot phosphor and covering materials disposed at respective sides of the layer is known as a means for improving color reproducibility of a display of image display devices such as liquid crystal display devices (see, for example, Patent Document 1 and Patent Document 2).

PRIOR ART DOCUMENT

Patent Document

Patent Document 1: Japanese National Phase Publication (JP-A) No. 2013-544018
Patent Document 2: International Publication (WO) No. 2016/052625

SUMMARY OF THE INVENTION

Problems to be Solved by the Invention

One of the properties that are required for the laminate as described above is favorable flatness. For example, a wavelength conversion member including a quantum dot phosphor, as mentioned above, may be used in a large area depending on the size of a display of an image display device. In that case, when there is warpage (or curling) in the wavelength conversion member, the wavelength conversion member may not achieve sufficient adhesion with respect to the display and may cause deterioration in image quality, failure in assembly and the like.

In view of the aforementioned, the present disclosure aims to provide a laminate and a wavelength conversion member that exhibit favorable flatness, and a backlight unit and an image display device using the same.

Means for Solving the Invention

The means for solving the problem as mentioned above include the following embodiments.
<1> A laminate, comprising an intermediate layer and a covering material A and a covering material B that are disposed on respective sides of the intermediate layer, the covering material A being disposed with an orientation direction at an angle of 20° or less with respect to an orientation direction of the covering material B.
<2> The laminate according to <1>, wherein each of the covering material A and the covering material B has a multilayer structure.
<3> The laminate according to <1> or <2>, wherein at least one of the covering material A or the covering material B has a water vapor transmission rate, at 40° C. and a relative humidity of 90%, of $1\times10^{-1}$ g/(m$^2$·day) or less.
<4> The laminate according to any one of <1> to <3>, wherein at least one of the covering material A or the covering material B has an oxygen transmission rate, at 30° C. and a relative humidity of 70%, of 1 cm$^3$/(m$^2$·day·atm) or less.
<5> A wavelength conversion member, comprising a wavelength conversion layer and a covering material A and a covering material B that are disposed on respective sides of the wavelength conversion layer, the covering material A being disposed with an orientation direction at an angle of 20° or less with respect to an orientation direction of the covering material B.
<6> The wavelength conversion member according to <5>, wherein each of the covering material A and the covering material B has a multilayer structure.
<7> The wavelength conversion member according to <5> or <6>, wherein at least one of the covering material A or the covering material B has a water vapor transmission rate, at 40° C. and a relative humidity of 90%, of $1\times10^{-1}$ g/(m$^2$·day) or less.
<8> The wavelength conversion member according to any one of <5> to <7>, wherein at least one of the covering material A or the covering material B has an oxygen transmission rate, at 30° C. and a relative humidity of 70%, of 1 cm$^3$/(m$^2$·day·atm) or less.
<9> The wavelength conversion member according to any one of <5> to <8>, wherein the wavelength conversion layer is a cured product of a composition comprising a wavelength conversion material, a polymerizable compound and a photolymerization initiator.
<10> The wavelength conversion member according to <9>, wherein the polymerizable compound comprises a thiol compound and at least one selected from the group consisting of a (meth)allyl compound and a (meth)acrylic compound.
<11> The wavelength conversion member according to <9> or <10>, wherein the wavelength conversion material comprises a quantum dot phosphor.
<12> A backlight unit, comprising the wavelength conversion member according to any one of <5> to <11> and a light source.
<13> An image display device, comprising the backlight unit according to <12>.

Effect of the Invention

According to the invention, a laminate and a wavelength conversion member that exhibit favorable flatness, and a backlight unit and an image display device using the same are provided.

BRIEF EXPLANATION OF THE DRAWINGS

FIG. 1 is a schematic view illustrating an exemplary configuration of a wavelength conversion member according to the disclosure.
FIG. 2 is a schematic view illustrating an exemplary configuration of a backlight unit according to the disclosure.

FIG. 3 is a schematic view illustrating an exemplary configuration of a liquid crystal image display device according to the disclosure.

EMBODIMENTS FOR IMPLEMENTING THE INVENTION

In the following, embodiments for implementing the invention are explained. However, the invention is not limited to these embodiments. The elements of the embodiments (including steps) are not essential, unless otherwise stated. The numbers and the ranges thereof do not limit the invention as well.

In the disclosure, the "process" refers not only to a process that is independent from the other steps, but also to a step that cannot be clearly distinguished from the other steps, as long as the aim of the process is achieved.

In the disclosure, the numerical range represented by "A to B" includes A and B as a minimum value and a maximum value, respectively.

In the disclosure, when numerical ranges are described in a stepwise manner, the values of the upper or lower limit of each numerical range may be substituted by the values of the upper or lower limit of the other numerical range, or may be substituted by the values described in the Examples.

In the disclosure, when there are more than one kind of substances corresponding to a component of a composition, the content of the component refers to a total content of the substances, unless otherwise stated.

In the disclosure, when there are more than one kind of particles corresponding to a component of a composition, the particle size of the component refers to a particle size of a mixture of the more than one kind of particles.

In the disclosure, the "layer" or "film" includes a state in which the layer or the film is formed over the entire region and a state in which the layer or the film is formed at a portion of the region, when the region is observed at which the layer or the film exists.

In the disclosure, the "laminate" refers to disposing a layer on another layer, and the layers may be bonded together or may be detachable from each other.

In the disclosure, the average thickness of a laminate or a layer included in the laminate refers to an arithmetic average value of measured values at randomly selected three points with a micrometer or a multilayer film thickness measurement device.

In the disclosure, the "(meth)acryloyl group" refers to at least one of acryloyl group or methacryloyl group, the "(meth)acrylic" refers to at least one of acrylic or methacrylic, the "(meth)acrylate" refers to at least one of acrylate or methacrylate, and the "(meth)allyl" refers to at least one of allyl or methallyl.

In the disclosure, the "(meth)allyl compound" refers to a compound having a (meth)allyl group in the molecule, and the "(meth)acrylic compound" refers to a compound having a (meth)acryloyl group in the molecule.

<Laminate>

The laminate according to the disclosure includes an intermediate layer and a covering material A and a covering material B that are disposed on respective sides of the intermediate layer, the covering material A being disposed with an orientation direction at an angle of 20° or less with respect to an orientation direction of the covering material B.

Generally, covering materials are prepared by cutting a large resin sheet, which has been stretched in order to strengthen the same, into a desired size. Therefore, the orientation direction of molecules tends to vary by location in the resin sheet due to the stretching. For example, the molecules in the vicinity of the center of the resin sheet tend to be oriented in a direction in which the resin sheet runs, and the orientation direction of the molecules tends to incline from the running direction, with distance from the center of the resin sheet. As a result, the orientation direction of molecules of the covering material may vary depending on the location of the resin sheet from which the covering material is obtained.

The inventors have found that a difference between the orientation directions of the covering materials, disposed at respective sides of an intermediate layer, may affect the flatness of a laminate. Further, the inventors have found that a laminate, having a pair of covering materials (covering material A and covering material B) disposed on respective sides of an intermediate layer, such that the covering material A is disposed with an orientation direction at an angle of 20° or less with respect to an orientation direction of the covering material B, exhibits excellent flatness. The reason for this has not been clear, but it is considered that a stress applied to the covering material A and a stress applied to the covering material B are canceled to each other by disposing the covering material A such that the angle between the orientation direction thereof and the orientation direction of the covering material B is 20° or less.

Therefore, it is possible to obtain a laminate having excellent flatness by disposing the covering material A such that the orientation direction thereof is at an angle of 20° or less with respect to an orientation direction of the covering material B, even if the orientation direction of the covering materials A and B are inclined from the running direction of the resin sheet.

In the disclosure, the "orientation direction" of the covering material refers to a direction in which molecules in the covering material are oriented (for example, a direction in which molecules are oriented due to stretching of a resin sheet from which the covering material is obtained). The orientation direction of the covering material is determined from the following method, for example.

The orientation direction is measured with an orientation measurement device (Nomura Shoji Co., Ltd.) by applying a longitudinal super-sonic pulse under an environment of 25° C. and measuring the propagation time (μ sec) or the propagation rate (km/sec), and performing calculations based on the data such as a degree of orientation or an aspect ratio.

When the orientation direction of the covering material is not uniform, the orientation direction at the center (when the covering material has a rectangle shape, the intersection of diagonal lines) or at a portion equivalent to the center of the covering material is regarded as the orientation direction of the covering material.

In the disclosure, the "angle of an orientation direction of the covering material B with respect to an orientation direction of the covering material A" refers to an angle measured in a state of the laminate. Specifically, for example, when the covering materials A and B have a front surface and back surface, respectively, and are disposed with the back surfaces facing the intermediate layer, the orientation direction of one of the covering materials is a direction viewed from the front-surface side thereof, while the other one of the covering materials is a direction viewed from the back-surface side thereof.

The orientation direction of the covering materials A and B in the laminate is not particularly limited, as long as the angle between the same is 20° or less in a state of the laminate.

From the viewpoint of achieving favorable flatness of the laminate, the angle of an orientation direction of the covering material B with respect to an orientation direction of the covering material A is preferably 15° or less, more preferably 10° or less.

The material for the covering material is not particularly limited, as long as molecules therein are oriented. For example, the covering material may be a resin sheet that has been subjected to a stretching process. Examples of the resin include polyester such as polyethylene terephthalate (PET) and polyethylene naphthalate (PEN), polyamide such as nylon, ethylene-vinyl alcohol copolymer, acrylonitrile copolymer and polyvinylidene chloride copolymer. The method of stretching the resin sheet is not particularly limited, and may be performed by a known process. The material of the covering material A and the covering material B may be the same or different from each other, but the material is preferably the same.

The covering material may have a single-layer structure or a multi-layer structure. Examples of the covering material having a multi-layer structure include a covering material having a functional layer with a function such as improving adhesion with respect to the intermediate layer, gas-barrier properties or moisture-barrier properties. The functional layer may be provided to a resin sheet before being stretched, or may be provided to a resin sheet after being stretched. The ratio of the thickness of the resin sheet with respect to the thickness of the functional layer (resin sheet: functional layer) may be from 5:5 to 9.5:0.5, for example.

When the covering material has a multi-layer structure, the laminate tends to curl due to the inclination in the orientation direction, which occurs during the stretching process. Therefore, by limiting the angle of the orientation direction of the covering material B with respect to the orientation direction of the covering material A to be 20° or less, the flatness of the laminate is improved more effectively.

From the viewpoint of protecting the intermediate layer, the covering material preferably has a barrier property against at least one of oxygen or water, more preferably has a barrier property against oxygen and water. The type of the covering material having a barrier property against at least one of oxygen or water is not particularly limited. For example, the covering material may have a barrier layer, as a functional layer, on at least one side of the resin sheet. Examples of the barrier layer include an inorganic layer including an inorganic material such as alumina, silica or the like.

As regards the water vapor transmission rate of the covering material, for example, at least one of the covering material A or the covering material B preferably has a water vapor transmission rate, at 40° C. and a relative humidity of 90%, of $1 \times 10^{-1}$ g/(m$^2$·day) or less.

The water vapor transmission rate of the covering material may be measured by using a water vapor transmission rate measurement device (for example, AQUATRAN, MOCON, Inc.)

As regards the oxygen transmission rate of the covering material, for example, at least one of the covering material A or the covering material B preferably has an oxygen transmission rate, at 30° C. and a relative humidity of 70%, of 1 cm$^3$ (cc)/(m$^2$·day·atm) or less. The oxygen transmission rate of the covering material may be measured by using an oxygen transmission rate measurement device (for example, OX-TRAN, MOCON, Inc.)

As regards the average thickness of the covering material, for example, at least one of the covering material A or the covering material B preferably has an average thickness of from 100 µm to 150 µm, more preferably from 100 µm to 140 µm, further preferably from 100 µm to 135 µm. When the average thickness is 100 µm or more, the covering material tends to have a sufficient function such as a barrier property. When the average thickness is 150 µm or less, decrease in light transmission rate of the covering material tends to be suppressed.

The material for the intermediate layer is not particularly limited. For example, the intermediate layer may have a function such as converting the wavelength of incident light, or intercepting the incident light. The laminate may include a single intermediate layer or may have multiple intermediate layers. When the laminate is used as a wavelength conversion member as described later, preferred embodiments of the wavelength conversion layer may be applied to the preferred embodiments of the intermediate layer.

The thickness of the intermediate layer is not particularly limited. For example, the intermediate layer preferably has an average thickness of from 50 µm to 200 µm, more preferably from 50 µm to 150 µm, further preferably from 80 µm to 120 µm.

The total thickness of the laminate is not particularly limited. For example, the laminate may have a total thickness selected from 250 µm to 500 µm.

The usage of the laminate is not particularly limited. From the viewpoint of taking advantage of excellent flatness, the laminate is suitably used for a purpose in which the laminate is disposed on a member having a large area (for example, 70 cm or more in length and 120 cm or more in width). For example, the laminate is suitably used as a member to be disposed on a display of an image display device as described later.

<Wavelength Conversion Member>

The wavelength conversion member of the disclosure includes a wavelength conversion layer and a covering material A and a covering material B that are disposed on respective sides of the wavelength conversion layer, the covering material A being disposed with an orientation direction at an angle of 20° or less with respect to an orientation direction of the covering material B.

The wavelength conversion member of the disclosure exhibits excellent flatness by having covering materials, which satisfy the condition as mentioned above, on respective sides of the wavelength conversion layer. Therefore, the wavelength conversion member can be attached to a display of a large-area image display device (such as a large-area television) with sufficient adhesion, while suppressing problems such as deterioration in image quality or troubles in assembly.

In the disclosure, the "wavelength conversion member" refers to a member that has a function of converting, by a wavelength conversion layer, a wavelength of light entering the wavelength conversion member. For example, the wavelength conversion member is used for a backlight unit of an image display device, such as a liquid crystal image display device.

From the viewpoint of further improvement in the use efficiency of light, the wavelength conversion member preferably has a total light transmittance of 55% or more, more preferably 60% or more, further preferably 65% or more. The total light transmittance of the wavelength conversion member is measured by a method according to JIS K 7136:2000.

The covering materials A and B, which are disposed on respective sides of the wavelength conversion layer, are not specifically limited as long as the covering material A is disposed with an orientation direction at an angle of 20° or less with respect to an orientation direction of the covering material B. The preferred embodiments of the covering materials of the laminate as described above can be applied to the preferred embodiments of the covering materials of the wavelength conversion member.

The wavelength conversion layer is not particularly limited, as long as it is capable of converting the wavelength of light entering the wavelength conversion member.

The wavelength conversion layer may convert the light into two or more kinds of different wavelengths. In that case, the wavelength conversion layer may be a single layer that converts the light into two or more kinds of different wavelengths, or the wavelength conversion layer may be a combination of two or more layers that convert the light into different wavelengths, respectively.

In an embodiment, the wavelength conversion layer may convert blue light into red light and green light. In that case, white light can be obtained as a result of combining the red light and the green light, which are obtained by the wavelength conversion layer, with the blue light that passes through the wavelength conversion member.

In an embodiment, the wavelength conversion layer may convert ultraviolet light into blue light, red light and green light. In that case, white light can be obtained as a result of combining the blue light, the red light and the green light obtained by the wavelength conversion layer.

The total thickness of the wavelength conversion member is not particularly limited. For example, the total thickness of the wavelength conversion member may be selected from 250 μm to 500 μm.

The average thickness of the wavelength conversion layer is preferably from 50 μm to 200 μm, more preferably from 50 μm to 150 μm, further preferably from 80 μm to 120 μm, for example. When the average thickness of the wavelength conversion layer is 50 μm or more, the wavelength conversion efficiency tends to improve. When the average thickness of the wavelength conversion layer is 200 μm or less, the thickness of a backlight unit can be further reduced when the wavelength conversion member is applied to the back light unit as described later.

From the viewpoint of further improving the adhesion with respect to the covering materials, the wavelength conversion layer preferably has a loss tangent (tan 6), as measured by dynamic viscoelastic measurement at a frequency of 10 Hz and 25° C., of from 0.4 to 1.5, more preferably from 0.4 to 1.2, further preferably from 0.4 to 0.6. The loss tangent (tan 6) of the wavelength conversion layer may be measured with a dynamic viscoelasticity measurement device (for example, Solid Analyzer RSA-III, Rheometric Scientific Ltd.)

From the viewpoint of further improving the adhesion with respect to the covering materials, resistance to heat, and resistance to heat and moisture, the wavelength conversion layer preferably has a glass transition temperature (Tg) of preferably from 25° C. to 40° C., more preferably from 25° C. to 35° C., further preferably from 30° C. to 35° C. The glass transition temperature (Tg) of the wavelength conversion layer may be measured with a dynamic viscoelasticity measurement device (for example, Solid Analyzer RSA-III, Rheometric Scientific Ltd.)

From the viewpoint of further improving the adhesion with respect to the covering materials, resistance to heat, and resistance to heat and moisture, the wavelength conversion layer preferably has a storage elastic modulus, as measured at a frequency of 10 Hz and 25° C., of from $1 \times 10^7$ Pa to $1 \times 10^9$ Pa, more preferably from $5 \times 10^7$ Pa to $1 \times 10^9$ Pa, further preferably from $5 \times 10^7$ Pa to $5 \times 10^8$ Pa. The storage elastic modulus of the wavelength conversion layer may be measured with a dynamic viscoelasticity measurement device (for example, Solid Analyzer RSA-III, Rheometric Scientific Ltd.)

(Wavelength Conversion Material)

The wavelength conversion layer may include a wavelength conversion material, or may include a phosphor as a wavelength conversion material. The type of the phosphor is not specifically limited, and examples thereof include an organic phosphor and an inorganic phosphor.

Examples of the organic phosphor include naphthalimide compounds and perylene compounds.

Examples of the inorganic phosphor include inorganic phosphors that emit red light, such as $Y_3O_3$:Eu, $YVO_4$:Eu, $Y_2O_2$:Eu, $3.5MgO \cdot 0.5MgF_2$, $GeO_2$:Mn and (Y.Cd)$BO_2$:Eu; inorganic phosphors that emit green light, such as ZnS:Cu.Al, (Zn.Cd)S:Cu.Al, ZnS:Cu.Au.Al, $Zn_2SiO_4$:Mn, $ZnSiO_4$:Mn, ZnS:Ag.Cu, (Zn.Cd)S:Cu, ZnS:Cu, GdOS:Tb, LaOS:Tb, $YSiO_4$:Ce. Tb, $ZnGeO_4$:Mn, GeMgAlO:Tb, SrGaS:Eu$^{2+}$, ZnS:Cu.Co, $MgO.nB_2O_3$:Ge.Tb, LaOBr:Tb.Tm and $La_2O_2S$:Tb; inorganic phosphors that emit blue light, such as ZnS:Ag, $GaWO_4$, $Y_2SiO_6$:Ce, ZnS:Ag—Ga.Cl, $Ca_2B_4OCl$:Eu$^{2+}$ and $BaMgAl_4O_3$:Eu$^{2+}$; and quantum dot phosphors.

From the viewpoint of color reproducibility of an image display device, the wavelength material preferably includes a quantum dot phosphor. The type of the quantum dot phosphor is not particularly limited, and examples thereof include II-VI compounds, III-V compounds, IV-VI compounds and IV compounds. From the viewpoint of light emission efficiency, the quantum dot phosphor preferably includes a compound that includes at least one of Cd or In.

Specific examples of the II-VI compound include CdSe, CdTe, CdS, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe and HgZnSTe.

Specific examples of the III-V compounds include GaN, GaP, GaAs, GaSb, AlN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs and InAlPSb.

Specific examples of the IV-VI compounds include SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe and SnPbSTe.

Specific examples of the IV compounds include Si, Ge, SiC and SiGe.

The quantum dot phosphor may have a core-shell structure. It is possible to improve the quantum efficiency of the quantum dot phosphor by selecting a compound having a wider band gap for the shell than the band gap of a compound used for the core. Examples of the combination of the core and the shell (core/shell) include CdSe/ZnS, InP/ZnS, PbSe/PbS, CdSe/CdS, CdTe/CdS and CdTe/ZnS.

The quantum dot phosphor may have a core-multi-shell structure, in which the shell is multi-layered. It is possible to further improve the quantum efficiency of the quantum dot phosphor by disposing one or more shells having a narrower band gap on the core having a wider band gap, and further disposing a shell having a wider band gap.

When the wavelength conversion layer includes a quantum dot phosphor, two or more kinds thereof having different compositions, average particle sizes, layered structures or the like may be used in combination. It is possible to adjust the light-emission central wavelength of the total wavelength conversion layer to a desired value by combining two or more kinds of quantum dot phosphor.

The wavelength conversion layer may include a quantum dot phosphor G, having a light-emission central wavelength in a green wavelength region of 520 nm to 560 nm, and a quantum dot phosphor R, having a light-emission central wavelength in a red wavelength region of 600 nm to 680 nm.

When the wavelength conversion layer including a quantum dot phosphor G and a quantum dot phosphor R is exposed to exciting light in a blue wavelength region of 430 nm to 480 nm, green light and red light are emitted from the quantum dot phosphor G and the quantum dot phosphor R, respectively. As a result, white light is obtained by combining the green light and the red light, emitted from the quantum dot phosphor G and the quantum dot phosphor R, with blue light that passes through the wavelength conversion layer.

The wavelength conversion material may be in the form of a dispersion, in which the wavelength conversion material is dispersed in a medium. Examples of the medium include organic solvents, silicone compounds and monofunctional (meth)acrylate compounds.

Examples of the organic solvent that may be used as the medium include acetonitrile, methanol, ethanol, acetone, 1-propanol, ethyl acetate, butyl acetate, toluene and hexane.

Examples of the silicone compound that may be used as the medium include straight silicone oils such as dimethyl silicone oil, methyl phenyl silicone oil and methyl hydrogen silicone oil; modified silicone oils such as amino-modified silicone oil, epoxy-modified silicone oil, carboxy-modified silicone oil, carbinol-modified silicone oil, mercapto-modified silicone oil, silicone oil modified with different functional groups, polyether-modified silicone oil, methyl styryl-modified silicone oil, hydrophilic specially-modified silicone oil, higher alkoxy-modified silicone oil, higher aliphatic acid-modified silicone oil and fluorine-modified silicone oil.

The monofunctional (meth)acrylate compound that may be used as the medium is not particularly limited as long as it is in a liquid form at room temperature (25° C.), and examples thereof include a monofunctional (meth)acrylate compound having an alicyclic structure (preferably isobornyl (meth)acrylate and dicyclopentanyl (meth)acrylate), methoxy polyethylene glycol (meth)acrylate, phenoxy polyethylene glycol (meth)acrylate, and ethoxylated o-phenyl phenol (meth)acrylate.

The dispersion may include a dispersant, as necessary. Examples of the dispersant include polyetheramine (JEFFAMINE M-1000, Huntsman Corporation).

The medium for dispersing the wavelength material may cause phase separation with other components included in the wavelength conversion layer, or may not cause phase separation with other components included in the wavelength conversion layer. For example, by using a silicone compound as a medium for dispersing the wavelength conversion material, in combination with a polymerizable compound as described later, it is possible to form a structure in which droplets of the silicone compound are dispersed in a cured product of the polymerizable compound.

The content of the wavelength conversion material in the wavelength conversion layer is preferably from 0.01% by mass to 1.0% by mass, more preferably from 0.05% by mass to 0.5% by mass, further preferably from 0.1% by mass to 0.5% by mass. When the content of the wavelength conversion material is 0.01% by mass or more, a sufficient property of wavelength conversion tends to be achieved. When the content of the wavelength conversion material is 1.0% by mass or less, aggregation of the wavelength conversion material tends to be suppressed.

The wavelength conversion layer may be in a state of a cured product that includes the wavelength conversion material. The cured product may be obtained by, for example, curing a composition including a wavelength conversion material, a polymerizable compound and a photopolymerization initiator (hereinafter, also referred to as a resin composition for wavelength conversion).

The polymerizable compound included in the resin composition for wavelength conversion is not particularly limited, and examples thereof include a thiol compound, a (meth)allyl compound, and a (meth)acrylic compound.

From the viewpoint of the adhesion between the wavelength conversion layer and the covering materials, the polymerizable compound preferably includes a thiol compound and at least one selected from the group consisting of a (meth)allyl compound and a (meth)acrylic compound.

The wavelength conversion layer, which is obtained by curing a resin composition for wavelength conversion that includes a thiol compound and at least one selected from the group consisting of a (meth)allyl compound and a (meth)acrylic compound, includes a sulfide structure (R—S—R', wherein R and R' are an organic group) that is formed by ene-thiol reaction caused by a thiol group and a carbon-carbon double bond included in a (meth)allyl group or a (meth)acryloyl group. As a result, adhesion between the wavelength conversion layer and the covering materials tends to improve. Further, the optical property of the wavelength conversion layer tends to improve.

(1) Thiol Compound

The thiol compound may be a monofunctional thiol compound, having one thiol group in one molecule, or a polyfunctional thiol compound, having two or more thiol groups in one molecule. The resin composition for wavelength conversion may include a single kind of thiol compound, or may include two or more kinds in combination.

The thiol compound may have a polymerizable group other than a thiol group (such as a (meth)acryloyl group or a (meth)allyl group) in the molecule, or may not have a polymerizable group other than a thiol group.

In the disclosure, a compound having a thiol group and a polymerizable group other than a thiol group in the molecule is regarded as a thiol compound.

Specific examples of the monofunctional thiol compound include hexanethiol, 1-heptanethiol, 1-octanethiol, 1-nonanethiol, 1-decanethiol, 3-mercaptopropionic acid, methyl mercaptopropionate, methoxybutyl mercaptopropionate, octyl mercaptopropionate, tridecyl mercaptopropionate, 2-ethylhexyl-3-mercaptopropionate, and n-octyl-3-mercaptopropionate.

Specific examples of the polyfunctional thiol compound include ethylene glycol bis(3-mercaptopropionate), diethylene glycol bis(3-mercaptopropionate), tetraethylene glycol bis(3-mercaptopropionate), 1,2-propylene glycol bis(3-mercaptopropionate), diethylene glycol bis(3-mercaptobutylate), 1,4-butanediol bis(3-mercaptopropionate), 1,4-butanediol bis(3-mercaptobutylate), 1,8-octanediol bis(3-mercaptopropionate), 1,9-octanediol bis(3-mercaptobutylate), hexanediol bisthioglycolate, trimethylolpropane tris(3-mercaptopropionate), trimethylolpropane tris(3-mercaptobutylate), trimethylolpropane tris(3- mercaptoisobutylate), trimethylolpropane tris(2-mercaptoisobutylate), trimethylolpropane tristhioglycolate, tris-[(3-mercaptopropionyloxy)-ethyl]-isocyanurate, trimethylolethane tris(3-mercaptobutylate), pentaerythritol tetrakis(3-mercaptopropionate), pentaerythritol tetrakis(3-mercaptobutylate), pentaerythritol tetrakis(3-mercaptoisobutylate), pentaerythritol tetrakis(2-mercaptoisobutylate), dipentaerythritol hexakis(3-mercaptopropionate), dipentaerythritol hexakis(2-mercaptopropionate), dipentaerythritol hexakis(3-mercaptobutylate), dipentadrythritol hexakis(3-mercaptoisobutylate), dipentaerythritol hexakis(2-mercaptoisobutylate), pentaerythritol tetrakis thioglycolate, and dipentaerythritol hexakis thioglycolate.

From the viewpoint of improving the adhesion between the wavelength conversion layer and the covering materials, resistance to heat, and resistance to heat and moist, the thiol compound preferably includes a polyfunctional thiol compound. The content of the polyfunctional thiol compound with respect to the total amount of thiol compound is preferably 80% by mass or more, more preferably 90% by mass or more, further preferably 100% by mass, for example.

The thiol compound may be in a state of a thioether oligomer, which is obtained by reaction of a thiol compound with a (meth)acrylic compound. It is possible to obtain a thioether oligomer by causing addition polymerization of a thiol compound with a (meth)acrylic compound under the presence of a polymerization initiator.

Among the thioether oligomers, from the viewpoint of optical properties, resistance to heat, and resistance to heat and moisture of a cured product, a thioether oligomer obtained by reaction of a polyfunctional thiol compound with a polyfunctional (meth)acrylic compound is preferred, and a thioether oligomer obtained by addition polymerization of pentaerythritol tetrakis(3-mercaptopropionate) with tris(2-acryloyloxyethyl)isocyanurate is more preferred.

The weight average molecular weight of the thioether oligomer is preferably from 3000 to 10000, more preferably from 3000 to 8000, further preferably from 4000 to 6000, for example.

The weight average molecular weight of the thioether oligomer is determined based on a molecular weight distribution, which is obtained by gel permeation chromatography (GPC) with standard polystyrene calibration curve, as described in the Examples.

The thiol equivalent amount of the thioether oligomer is preferably from 200 g/eq to 400 g/eq, more preferably from 250 g/eq to 300 g/eq, further preferably from 250 g/eq to 270 g/eq.

The thiol equivalent amount of the thioether oligomer is measured by the iodine titration method as described below.

A sample solution is prepared by adding 20 mL of chloroform to 0.2 g of the sample. Then, 20 mL of pure water, 10 mL of isopropyl alcohol and 1 mL of a starch indicator are added to the sample solution, and stirred with a stirrer. The starch indicator is prepared by dissolving 0.275 g of soluble starch in 30 g of pure water.

An iodine solution is dripped into the sample solution, and a point at which the chloroform layer becomes green is regarded as the terminal point. At this point, the thiol equivalent amount of the sample is calculated by the following formula.

Thiol equivalent amount (g/eq)=mass of sample (g)× 10000/amount of iodine solution added (mL)× factor of iodine solution When the resin composition for wavelength conversion includes a thiol compound, the content of the thiol compound is preferably from 5% by mass to 80% by mass, more preferably 15% by mass to 70% by mass, further preferably from 20% by mass to 60% by mass, for example, with respect to the total amount of resin composition for wavelength conversion.

When the content of the thiol compound is 5% by mass or more, adhesion of a cured product with respect to the covering material tends to further improve. When the content of the thiol compound is 80% by mass or less, resistance to heat and resistance to heat and moisture tend to further improve.

(2) (Meth)Allyl Compound

The (meth)allyl compound may be a monofunctional (meth)allyl compound, having one (meth)allyl group in one molecule, or may be a polyfunctional (meth)allyl compound, having two or more (meth)allyl group in one molecule. The resin composition for wavelength conversion may include a single kind of (meth)allyl compound, or may include two or more kinds in combination.

The (meth)allyl compound may have a polymerizable group other than a (meth)allyl group (such as a (meth)acryloyl group) or may not have a polymerizable group other than a (meth)allyl group.

In the disclosure, a compound having a (meth)allyl group and a polymerizable group other than a (meth)allyl group (except for a thiol compound) is regarded as a (meth)allyl compound.

Specific examples of the monofunctional (meth)allyl compound include (meth)allyl acetate, (meth)allyl n-propionate, (meth)allyl benzoate, (meth)allyl phenyl acetate, (meth)allyl phenoxy acetate, (meth)allyl methyl ether, and (meth)allyl glycidyl ether.

Specific examples of the polyfunctional (meth)allyl compound include di(meth)allyl benzenedicarboxylate, di(meth)allyl cyclohexanedicarboxylate, di(meth)allyl maleate, di(meth)allyl adipate, di(meth)allyl phthalate, di(meth)allyl isophthalate, di(meth)allyl terephthalate, glycerin di(meth)allyl ether, trimethylolpropane di(meth)allyl ether, pentaerythritol di(meth)allyl ether, 1,3-di(meth)allyl-5-glycidyl isocyanurate, tri(meth)allyl cyanurate, tri(meth)allyl isocyanurate, tri(meth)allyl trimellitate, tetra(meth)allyl pyromellitate, 1,3,4,6-tetra (meth)allyl glycoluril, 1,3,4,6-tetra (meth)allyl-3a-methyl glycoluril, and 1,3,4,6-tetra (meth)allyl-3a,6a-dimethyl glycoluril.

From the viewpoint of the resistance to heat and resistance to heat and moisture of a cured product, the (meth)allyl compound is preferably at least one selected from the group consisting of a compound having an isocyanurate structure such as tri(meth)allyl isocyanurate, tri(meth)allyl cyanurate, di(meth)allyl benzenedicarboxylate, and di(meth)allyl cyclohexanedicarboxylate; more preferably a compound having a triisocyanurate structure; further preferably tri (meth)allyl isocyanurate.

(3) (Meth)Acrylic Compound

The (meth)acrylic compound may be a monofunctional (meth)acrylic compound having one (meth)acryloyl group in one molecule, or may be a polyfunctional (meth)acrylic compound having two or more (meth)acryloyl groups in one molecule. The resin composition for wavelength conversion may include a single kind of (meth)acrylic compound, or may include two or more kinds in combination.

Specific examples of the monofunctional (meth)acrylic compound include (meth)acrylic acid; alkyl (meth)acrylates having an alkyl group of 1 to 18 carbon atoms, such as methyl (meth)acrylate, n-butyl (meth)acrylate, isobutyl (meth)acrylate, 2-ethylhexyl (meth)acrylate, isononyl (meth)acrylate, n-octyl (meth)acrylate, lauryl (meth)acrylate, and stearyl (meth)acrylate; (meth)acrylate compounds having an aromatic ring, such as benzyl (meth)acrylate and phenoxyethyl (meth)acrylate; alkoxyalkyl (meth)acrylate, such as butoxyethyl (meth)acrylate; aminoalkyl (meth)acrylates, such as N,N-dimethylaminoethyl (meth)acrylate; polyalkylene glycol monoalkyl ether (meth)acrylate, such as diethylene glycol monoethyl ether (meth)acrylate, triethylene glycol monobutyl ether (meth)acrylate, tetraethylene glycol monomethyl ether (meth)acrylate, hexaethylene glycol monomethyl ether (meth)acrylate, octaethylene glycol monomethyl ether (meth)acrylate, nonaethylene glycol monomethyl ether (meth)acrylate, dipropylene glycol monomethyl ether (meth)acrylate, heptapropylene glycol monomethyl ether (meth)acrylate, and tetraethylene glycol monoethyl ether (meth)acrylate; polyalkylene glycol monoaryl ether (meth)acrylates, such as hexaethylene glycol monophenyl ether (meth)acrylate; (meth)acrylate compounds having an alicyclic structure, such as cyclohexyl (meth)acrylate, dicyclopentanyl (meth)acrylate, isobornyl (meth)acrylate, and methylene oxide-added cyclododecatriene (meth)acrylate; (meth)acrylate compounds having a hetero ring, such as (meth)acryloyl morpholine and tetrahydrofuryl (meth)acrylate; fluoroalkyl (meth)acrylates, such as heptadecafluorodecyl (meth)acrylate; (meth)acrylate compounds having a hydroxy group, such as 2-hydroxyethyl (meth)acrylate, 3-hydroxypropyl (meth)acrylate, 4-hydroxybutyl (meth)acrylate, triethylene glycol mono(meth) acrylate, tetraethylene glycol mono(meth)acrylate, hexaethylene glycol mono(meth)acrylate, and octapropylene glycol mono(meth)acrylate; (meth)acrylate compounds having a glycidyl group, such as glycidyl (meth)acrylate; (meth) acrylate compounds having an isocyanate group, such as 2-(2-(meth)acryloyloxyethyloxy)ethyl isocyanate, and 2-(meth)acryloyloxyethyl isocyanate; polyalkylene glycol mono(meth)acrylates, such as tetraethylene glycol mono (meth)acrylate, hexaethylene glycol mono(meth)acrylate, and octapropylene glycol mono(meth)acrylate; (meth)acrylamide compounds, such as (meth)acrylamide, N,N-dimethyl (meth)acrylamide, N-isopropyl (meth)acrylamide, N,N-dimethylaminopropyl (meth)acrylamide, N—N-diethyl (meth)acrylamide, and 2-hydroxyethyl (meth)acrylamide.

Specific examples of the polyfunctional (meth)acrylic compound include alkylene glycol di(meth)acrylates, such as 1,4-butanediol di(meth)acrylate, 1,6-hexanediol di(meth) acrylate, and 1,9-nonanediol di(meth)acrylate; polyalkylene glycol di(meth)acrylates, such as polyethylene glycol di(meth)acrylate, and polypropylene glycol di(meth)acrylate; tri (meth)acrylate compounds, such as trimethylol propane tri(meth)acrylate, ethylene oxide-added trimethylol propane tri(meth)acrylate, and tris(2-acryloyloxyethyl) isocyanurate; tetra(meth)acrylate compounds, such as ethylene oxide-added pentaerythritol tetra(meth)acrylate, trimethylol propane tetra(meth)acrylate, and pentaerythritol tetra(meth) acrylate; and (meth)acrylate compounds having an alicyclic structure, such as tricyclodecane dimethanol di(meth)acrylate, cyclohexane dimethanol di(meth)acrylate, 1,3-adamantane dimethanol di(meth)acrylate, hydrogenated bisphenol A (poly)ethoxy di(meth)acrylate, hydrogenated bisphenol A (poly)propoxy di(meth)acrylate, hydrogenated bisphenol F (poly)ethoxy di(meth)acrylate, hydrogenated bisphenol F (poly)propoxy di(meth)acrylate, hydrogenated bisphenol S (poly)ethoxy di(meth)acrylate, and hydrogenated bisphenol S (poly)propoxy di(meth)acrylate.

From the viewpoint of further improving the resistance to heat and resistance to heat and moisture of a cured product, the (meth)acrylic compound is preferably a (meth)acrylate compound having an alicyclic structure or an aromatic ring structure. Examples of the alicyclic structure or the aromatic ring structure include an isobornyl structure, a tricyclodecane structure and a bisphenol structure.

The (meth)acrylic compound may be a (meth)acrylic compound having an alkyleneoxy group, or may be a difunctional (meth)acrylic compound having an alkyleneoxy group.

The alkyleneoxy group is preferably an alkyleneoxy group having 2 to 4 carbon atoms, more preferably an alkyleneoxy group having 2 or 3 carbon atoms, and an alkyleneoxy group having 2 carbon atoms.

The (meth)acrylic compound may have a single kind of alkyleneoxy group, or may have two or more kinds thereof.

The compound having an alkyleneoxy group may be a compound having a polyalkyleneoxy group, which includes multiple alkyleneoxy groups.

When the (meth)acrylic compound has an alkyleneoxy group, the number of the alkyleneoxy group in one molecule is preferably from 2 to 30, more preferably from 2 to 20, further preferably from 3 to 10, particularly preferably from 3 to 5.

When the (meth)acrylic compound has an alkyleneoxy group, the compound preferably has a bisphenol structure in view of achieving favorable heat resistance. Examples of the bisphenol structure include a bisphenol A structure and a bisphenol F structure, preferably a bisphenol A structure.

Specific examples of the (meth)acrylic compound having an alkyleneoxy group include alkoxyalkyl (meth)acrylates, such as butoxyethyl (meth)acrylate; polyalkylene glycol monoalkyl ether (meth)acrylate, such as diethyelne glycol monoethyl ether (meth)acrylate, triethylene glycol monobutyl ether (meth)acrylate, tetraethylene glycol monomethyl ether (meth)acrylate, hexaethylene glycol monomethyl ether (meth)acrylate, octaethylene glycol monomethyl ether (meth)acrylate, nonaethylene glycol monomethyl ether (meth)acrylate, dipropylene glycol monomethyl ether (meth)acrylate, heptapropylene glycol monomethyl ether (meth)acrylate, and tetraethylene glycol monoethyl ether (meth)acrylate; polyalkylene glycol monoaryl ether (meth)acrylates, such as hexaethylene glycol monophenyl ether (meth)acrylate; (meth)acrylate compounds having a hetero ring, such as tetrahydrofurfuryl (meth)acrylate; (meth)acrylate compounds having a hydroxy group, such as triethyelne glycol mono(meth)acrylate, tetraethylene glycol mono(meth)acrylate, hexaethyelene glycol mono(meth)acrylate, and octapropylene glycol mono(meth)acrylate; (meth)acrylate compounds having a glycidyl group, such as glycidyl (meth)acrylate; polyalkylene glycol di(meth)acrylates, such as polyethylene glycol di(meth)acrylate and polypropylene glycol di(meth)acrylate; tri(meth)acrylate compounds, such as ethylene oxide-added trimethylol propane tri(meth)acrylate; tetra(meth) acrylate compounds, such as ethylene oxide-added pentaerythritol tetra(meth)acrylate; and a bisphenol-type di(meth)acrylate compounds, such as ethoxylated bisphenol A di(meth)acrylate, propoxylated bisphenol A di(meth)acrylate, and propoxylated ethoxylated bisphenol A (meth)acrylate.

Among the (meth)acrylic compounds having an alkyleneoxy group, ethoxylated bisphenol A di(meth)acrylate, propoxylated bisphenol A di(meth)acrylate, and propoxylated ethoxylated bisphenol A (meth)acrylate are preferred, and ethoxylated bisphenol A di(meth)acrylate is more preferred.

In an embodiment, the polymerizable compound may include a thioether oligomer as a thiol compound and a (meth)allyl compound (preferably, a polyfunctional (meth) allyl compound). In that case, the content of the (meth)allyl compound with respect to the total amount of the resin composition for wavelength conversion may be from 10% by mass to 50% by mass, or from 15% by mass to 45% by mass, or from 20% by mass to 40% by mass, for example.

When the polymerizable compound include a thioether oligomer as a thiol compound and a (meth)allyl compound, the wavelength conversion material to be used in combination is preferably in a state of a dispersion in which the wavelength conversion material is dispersed in a silicone compound.

In an embodiment, the polymerizable compound may include a thiol compound that is not in a state of thioether oligomer and a (meth)acrylic compound (preferably a polyfuntional (meth)acrylic compound, more preferably a difunctional (meth)acrylic compound). In that case, the content of the (meth)acrylic compound with respect to the total amount of the resin composition for wavelength conversion may be from 40% by mass to 90% by mass, or from 60% by mass to 90% by mass, or from 75% by mass to 85% by mass, for example.

When the polymerizable compound includes a thiol compound that is not in a state of thioether oligomer and a (meth)acrylic compound, the wavelength conversion material to be used in combination is preferably in a state of a dispersion in which the wavelength conversion material is dispersed in a (meth)acrylic compound, preferably a monofunctional (meth)acrylic compound, more preferably isobornyl (meth)acrylate, as a medium.

(Photopolymerization Initiator)

The photopolymerization initiator included in the resin composition for wavelength conversion is not particularly limited, and examples thereof include a compound that generates radicals when it is exposed to active energy rays such as ultraviolet rays.

Specific examples of the photopolymerization initiator include aromatic ketone compounds, such as benzophenone, N,N'-tetraalkyl-4,4-di aminobenzophenone, 2-benzyl-2-dimethyl amino-1-(4-morpholinophenyl)-butanone-1, 2-methyl-1-[4-(methylthio)phenyl]-2-morpholino-propanone-1,4,4'-bis(dimethylamino)benzophenone (Michler's ketone), 4,4'-bis(diethylamino)benzophenone, 4-methoxy-4'-dimethylaminobenzophenone, 1-hydroxy cyclohexyl phenyl ketone, 1-(4-isopropylphenyl)-2-hydroxy-2-methyl-propan-1-one, 1-(4-(2-hydroxyethoxy)-phenyl)-2-hydroxy-2-methyl-1-propan-1-one, and 2-hydroxy-2-methyl-1-phenylpropan-1-one; quinone compounds, such as alkyl anthraquinone and phenanthrenequinone; benzoin compounds, such as benzoin and alkylbenzoin; benzoin ether compounds, such as benzoin alkyl ether and benzoin phenyl ether; benzil derivatives, such as benzil dimethylketal; 2,4,5-triaryl imidazole dimers, such as 2-(o-chlorophenyl)-4,5-diphenyl imidazole dimer, 2-(o-chlorophenyl)-4,5-di(m-methoxyphenyl) imidazole dimer, 2-(o-fluorophenyl)-4,5-diphenyl imidazole dimer, 2-(o-methoxyphenyl)-4,5-diphenyl imidazole dimer, 2,4-di(p-methoxyphenyl)-5-phenyl imidazole dimer, and 2-(2,4-dimethoxyphenyl)-4,5-diphenyl imidazole dimer; acridine derivatives, such as 9-phenyl acridine, and 1,7-(9,9'-acridinyl)heptane; oxime ester compounds, such as 1,2-octanedione 1-[4-(phenyl-thio)-2-(O-benzoyloxime)], and ethanone 1-[9-ethyl-6-(2-methylbenzoyl)-9H-carbazol-3-yl]-1-(O-acetyloxime); coumarin compounds, such as 7-diethylamino-4-methyl coumarin; thioxanthone compounds, such as 2,4-diethyl thioxanthone; and acylphosphine oxide compounds, such as 2,4,6-trimethylbenzoyl-diphenyl-phosphine oxide and 2,4,6-trimethylbenzoyl-phenyl-ethoxy-phosphine oxide.

The resin composition for wavelength conversion may include a single kind of photopolymerization initiator, or may include two or more kinds in combination.

From the viewpoint of curability, the photopolymerization initiator is preferably at least one selected from the group consisting of an acylphosphine oxide compound, an aromatic ketone compound and an oxime ester compound, more preferably at least one selected from the group consisting of an acylphosphine oxide compound and an aromatic ketone compound, further preferably an acylphosphine oxide compound.

The content of the photopolymerization initiator with respect to the total amount of the resin composition for wavelength conversion is preferably from 0.1% by mass to 5% by mass, more preferably from 0.1% by mass to 3% by mass, further preferably from 0.1% by mass to 1.5% by mass. When the content of the photopolymerization initiator is 0.1% by mass or more, sensitivity of the resin composition for wavelength conversion tends to be sufficient. When the content of the photopolymerization initiator is 5% by mass or less, effects on color hue or deterioration in storage stability of the resin composition for wavelength conversion tends to be suppressed.

(Light Scattering Material)

From the viewpoint of improving the light conversion efficiency, the wavelength conversion layer may include a light scattering material.

Specific examples of the light scattering material include titanium oxide, barium sulfate, zinc oxide, and calcium carbonate. Among these, titanium oxide is preferred from the viewpoint of light scattering efficiency. The titanium oxide may be rutile type or anatase type, but is preferably rutile type.

The average particle size of the light scattering material is preferably from 0.1 μm to 1 μm, more preferably from 0.2 μm to 0.8 μm, further preferably from 0.2 μm to 0.5 μm.

The average particle size of the light scattering material is measured by the following method.

The light scattering material, which has been extracted from the resin composition for wavelength conversion, is dispersed in a purified water including a surfactant to prepare a dispersion. Then, a volume-based particle size distribution of the dispersion is measured with a laser diffraction particle size analyzer (for example, SALD-3000J, Shimadzu Corporation) and the particle size at which the accumulation from the side of smaller particle size is 50% is determined as the average particle size of the light scattering material.

The extraction of the light scattering material from the resin composition for wavelength conversion can be performed by, for example, diluting the resin composition for wavelength conversion with a liquid medium and allowing the light scattering material to precipitate, and collecting the same by performing centrifugal separation or the like.

When the light scattering material is included in the cured resin, it is possible to measure the average particle size with a scanning electron microscope, as an arithmetic average value of the equivalent circle diameters (average value of major axis and minor axis) of 50 particles.

When the resin composition for wavelength conversion includes a light scattering material, from the viewpoint of suppressing the aggregation of the light scattering material in the resin composition for wavelength conversion, the light scattering material preferably has an organic substance layer that includes an organic substance, at least at a portion of the surface thereof.

Specific examples of the organic substance include organic silanes, organosiloxanes, fluorosilanes, organic phosphonates, organic phosphoric acid compounds, organic phosphinates, organic sulfonic acid compounds, carboxylic acids, carboxylic acid esters, carboxylic acid derivatives, amides, hydrocarbon wax, polyolefins, polyolefin copolymers, polyols, polyol derivatives, alkanolamines, alkanolamine derivatives, and organic dispersants.

The organic substance included in the organic substance layer preferably includes a polyol or an organic silane, more preferably at least one of a polyol or an organic silane.

Specific examples of the organic silane include octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, and octadecyltriethoxysilane.

Specific examples of the organosiloxane include polydimethylsiloxane (PDMS) terminated with a trimethylsilyl group, polymethylhydrosiloxane (PMHS), and a polysiloxane derived by functionalization of PMHS with an olefin (hydrosilylation).

Specific examples of the organic phosphonate include n-octyl phosphonic acid and an ester thereof, n-decyl phosphonic acid and an ester thereof, 2-ethylhexyl phosphonic acid and an ester thereof, and camphyl phosphonic acid and an ester thereof.

Specific examples of the organic phosphoric acid compound include organic acidic phosphate, organic pyrophosphate, organic polyphosphate, organic metaphosphate, and a salt thereof.

Specific examples of the organic phosphinate include n-hexyl phosphinic acid and an ester thereof, n-octyl phosphinic acid and an ester thereof, di-n-hexyl phosphinic acid and an ester thereof, and di-n-octyl phosphinic acid and an ester thereof.

Specific examples of the organic sulfonic acid include alkyl sulfonic acids, such as hexyl sulfonic acid, octyl sulfonic acid and 2-ethylhexyl sulfonic acid, and a salt of these alkyl sulfonic acids with a metal ion such as sodium, calcium, magnesium, aluminum or titanium, an ammonium ion, or an organic ammonium ion such triethanolamine.

Specific examples of the carboxylic acid include maleic acid, malonic acid, fumaric acid, benzoic acid, phthalic acid, stearic acid, oleic acid and linoleic acid.

Specific examples of the carboxylic acid ester include an ester or a partial ester obtained by reaction of these carboxylic acids with a hydroxy compound such as ethylene glycol, propylene glycol, trimethylol propane, diethanolamine, triethanolamine, glycerol, hexanetriol, erythritol, mannitol, sorbitol, pentaerythritol, bisphenol A, hydroquinone or phloroglucinol.

Specific examples of the amide include stearic acid amide, oleic acid amide an erucic acid amide.

Specific examples of the polyolefin and polyolefin copolymer include polyethylene, polypropylene, and a copolymer of ethylene with at least one compound selected from propylene, butylene, vinyl acetate, acrylate and acrylamide.

Specific examples of the polyol include glycerol, trimethylol ethane, and trimethylol propane.

Specific examples of the alkanolamine include diethanolamine and triethanolamine.

Specific examples of the organic dispersant include citric acid, polyacrylic acid, polymethacrylic acid, and polymeric organic dispersants having a functional group such as an anionic group, a cationic group, an ampholytic group or a nonionic group.

When the aggregation of the light scattering material in the resin composition for wavelength conversion is suppressed, dispersibility of the light scattering material in the cured resin tends to improve.

The light scattering material may have a metal oxide layer that includes a metal oxide, at least at a portion of the surface. Examples of the metal oxide included in the metal oxide layer include silica, alumina, zirconia, phosphoria and boria. The light scattering material may have a single metal oxide layer alone, or may have two or more metal oxide layers.

When the light scattering material has two metal oxide layers, the layers preferably includes a first metal oxide layer that includes silica and a second metal oxide layer that includes alumina.

By providing a metal oxide layer to the light scattering material, dispersibility of the light scattering material in the cured resin, which includes an alicyclic structure and a sulfide structure, tends to improve.

When the light scattering material has an organic substance layer that includes an organic substance and a metal oxide layer, it is preferred to provide the metal oxide layer and the organic substance layer, on the surface of the light scattering material, in this order.

When the light scattering material has an organic substance layer and two metal oxide layers, it is preferred to provide the first metal oxide layer including silica, the second metal oxide layer including alumina, and the organic substance layer, on the surface of the light scattering material, in this order (i.e., the organic substance layer is the outermost layer).

When the resin composition for wavelength conversion includes a light scattering material, the content of the light scattering material with respect to the total amount of the resin composition for wavelength conversion is preferably from 0.1% by mass to 1.0% by mass, more preferably from 0.2% by mass to 1.0% by mass, further preferably from 0.3% by mass to 1.0% by mass, for example.

(Other Components)

The resin composition for wavelength conversion may include other components, such as a liquid medium (such as organic solvent), a polymerization inhibitor, a silane coupling agent, a surfactant, an adhesion-imparting agent, and an antioxidant. The resin composition for wavelength conversion may include a single kind of each component, or may include two or more of the component in combination.

Configuration Examples

FIG. 1 shows an example of schematic configuration of the wavelength conversion member. However, the wavelength configuration member of the disclosure is not limited to the configuration of FIG. 1. The size of the wavelength conversion member and the covering materials in FIG. 1 is conceptual, and the relative relationship in actual size is not limited thereto. In the drawings, the same members are given the same symbol and overlapping explanations may be omitted.

In FIG. 1, wavelength conversion member 10 has wavelength conversion layer 11, and covering materials 12A and 12B disposed on respective sides of wavelength conversion layer 11. The type and the average thickness of covering materials 12A and 12B may be the same or different from each other.

Covering material 12A is disposed with an orientation direction at an angle of 20° or less with respect to an orientation direction of covering material 12B.

The wavelength conversion member of the configuration shown in FIG. 1 may be produced by a known process as described below.

First, a coating layer is formed on a film-like covering material, which is conveyed in a continuous manner (hereinafter, referred to as the first covering material), by applying a resin composition for wavelength conversion. The method of applying the resin composition for wavelength conversion is not particularly limited, and may be performed by die coating, curtain coating, extrusion coating, rod coating, roll coating or the like.

Next, a film-like covering material, which is conveyed in a continuous manner (hereinafter, referred to as the second covering material), is disposed on the coating layer.

Subsequently, either the first covering material or the second covering material, which is transmissive to active energy ray, is exposed to the active energy ray, thereby forming a cured product layer by curing the coating layer. Thereafter, the laminate is cut into a desired size, and a wavelength conversion member having a configuration shown in FIG. 1 is obtained.

The wavelength and the irradiance of the active energy ray can be adjusted depending on the components of the resin composition for wavelength conversion, thickness of the wavelength conversion layer, and the like. In an embodiment, ultraviolet ray in a wavelength region of 280 nm to 400 nm is used at 100 mJ/cm$^2$ to 5000 mJ/cm$^2$. Examples of the light source for ultraviolet ray include a low-pressure mercury lamp, a middle-pressure mercury lamp, a high-pressure mercury lamp, a super-high-pressure mercury lamp, a carbon arc lamp, a metal halide lamp, a xenon lamp, a chemical lamp, a black light lamp, and a microwave-excited mercury lamp.

When neither the first covering material nor the second covering material is transmissive to active energy ray, it is possible to form a cured product layer by exposing the coating layer to the active energy ray before disposing the second covering material thereon.

<Backlight Unit>

The backlight unit of the disclosure has a light source and the wavelength conversion member of the disclosure.

From the viewpoint of improving the color reproducibility, the backlight unit is preferably adapted to multi-wavelength light source.

In a preferred embodiment, the backlight unit emits blue light having the light-emission central wavelength within 430 nm to 480 nm and having a light-emission intensity peak with a half width of not greater than 100 nm; green light having the light-emission central wavelength within 520 nm to 560 nm and having a light-emission intensity peak with a half width of not greater than 100 nm; and red light having the light-emission central wavelength within 600 nm to 680 nm and having a light-emission intensity peak with a half width of not greater than 100 nm. The half width of the light-emission intensity peak refers to a width of the peak measured at ½ in height of the peak.

From the viewpoint of further improving the color reproducibility, the backlight unit preferably emits blue light having the light-emission central wavelength within 440 nm to 475 nm. From the same viewpoint, the backlight unit preferably emits green light having the light-emission central wavelength within 520 nm to 545 nm. From the same viewpoint, the backlight unit preferably emits red light having the light-emission central wavelength within 610 nm to 640 nm.

From the viewpoint of further improving the color reproducibility, the half width of the light-emission intensity peak of the blue light, the green light and the red light, emitted from the wavelength conversion member, is preferably not greater than 80 nm, more preferably not greater than 50 nm, further preferably not greater than 40 nm, yet further preferably not greater than 30 nm, particularly preferably not greater than 25 nm.

As regards the light source of the backlight unit, for example, a light source that emits blue light having the light-emission central wavelength within 430 nm to 480 nm may be used. The type of the light source may be LEDs (Light Emitting Diodes) or laser beams, for example.

When a light source that emits blue light is used, the wavelength conversion member preferably includes at least a quantum dot phosphor R, which emits red light, and a quantum dot phosphor G, which emits green light. In that case, white light is obtained by combining the red light and the green light emitted from the wavelength conversion member and the blue light that passes through the wavelength conversion member.

It is possible to use a light source that emits ultraviolet light having the light-emission central wavelength within 300 nm to 430 nm may be used as the light source of the backlight unit, for example. The type of the light source may be LEDs or laser beams, for example.

When a light source that emits ultraviolet light is used, the wavelength conversion member preferably includes a quantum dot phosphor B, which emits blue light upon excitation with exciting light, together with a quantum dot phosphor R and a quantum dot phosphor G. In that case, white light is obtained by combining the red light, the green light and the blue light, which are emitted from the wavelength conversion member.

The backlight unit may be edge-lighting type or direct-lighting type.

FIG. 2 shows an example of schematic configuration of a backlight unit of edge-lighting type. However, the backlight unit of the disclosure is not limited to the configuration of FIG. 2. The size of the wavelength conversion member and the covering materials in FIG. 2 is conceptual, and the relative relationship in actual size is not limited thereto.

In FIG. 2, backlight unit 20 has light source 21 that emits blue light $L_B$; light guide plate 22 that guides blue light $L_B$ emitted from light source 21 and emits the same; wavelength conversion member 10 that is disposed opposite to light guide plate 22; retroreflection member 23 that is disposed opposite to light guide plate 22 via wavelength conversion member 10; and reflection plate 24 that is disposed opposite to wavelength conversion member 10 via light guide plate 22.

Wavelength conversion member 10 emits red light $L_R$ and green light $L_G$, by using part of blue light $L_B$ as exciting light, and emits red light $L_R$, green light $L_G$, and blue light $L_B$ that is not used as exciting light. Retroreflection member 23 emits white light $L_W$, which is produced by combination of red light $L_R$, green light $L_G$ and blue light $L_B$.

<Image Display Device>

The image display device of the disclosure has the backlight unit of the disclosure. The type of the image display device is not particularly limited, and may be a liquid crystal display device, for example.

FIG. 3 shows an example of schematic configuration of a liquid crystal display device. However, the liquid crystal display device of the disclosure is not limited to the configuration of FIG. 3. The size of the wavelength conversion member and the covering materials in FIG. 3 is conceptual, and the relative relationship in actual size is not limited thereto.

In FIG. 3, liquid crystal display device 30 has backlight unit 20 and liquid crystal cell unit 31 that is disposed opposite to backlight unit 20. Liquid crystal cell unit 31 has a configuration in which liquid crystal cell 32 is disposed between polarization plate 33A and polarization plate 33B.

The drive system of liquid crystal cell 32 is not particularly limited, and examples thereof include TN (Twisted Nematic) system, STN (Super Twisted Nematic) system, VA (Vertical Alignment) system, IPS (In-Plane-Switching) system, and OCB (Optically Compensated Birefringence) system.

EXAMPLES

In the following, the disclosure is explained based on the Examples. However, the disclosure is not limited to the Examples.

(Preparation of Resin Composition for Wavelength Conversion)

Resin compositions for wavelength conversion are prepared by mixing the following components in the amounts (parts by mass) indicated in Table 1. The hyphen (-) in Table 1 indicates that the corresponding component is not included.

Thiol compound 1: thioether oligomer synthesized in Synthesis Example 1

Thiol compound 2: pentaerythritol tetrakis(3-mercaptopropionate) (PEMP, SC Organic Chemical Co., Ltd.)

(Meth)allyl compound: triallyl isocyanurate (TAIC, Nippon Kasei Chemical Company Limited)

(Meth)acrylic compound: tricyclodecane dimethanol diacrylate (A-DCP, Shin-Nakamura Chemical Co., Ltd.)

Photopolymerization initiator 1: 2,4,6-trimethylbenzoyl-phenyl-ethoxy-phosphine oxide (IRGACURE TPO, BASF SE)

Photopolymerization initiator 2: 2,4,6-trimethylbenzoyl diphenyl phosphine oxide (SB-PI 718, Sort Co., Ltd.)

Light scattering material: titanium oxide, having a first metal oxide layer including silica; a second metal oxide layer including alumina; and an organic substance layer, in this order (Ti-Pure R-706, Chemours Company, volume average particle size: 0.36 μm)

Wavelength conversion material 1: amino-modified silicone dispersion of quantum dot phosphor that emits green light, having CdSe core and ZnS shell (Gen 2.0 QD Concentrate, Nanosys Inc., quantum dot phosphor concentration: 8% by mass)

Wavelength conversion material 2: amino-modified silicone dispersion of quantum dot phosphor that emits red light, having CdSe core and ZnS shell (Gen 2.0 QD Concentrate, Nanosys Inc., quantum dot phosphor concentration: 8% by mass)

Wavelength conversion material 3: isobornyl acrylate dispersion of quantum dot phosphor that emits green light, having CdSe core and ZnS shell (Gen 3.5 QD Concentrate, Nanosys Inc., quantum dot phosphor concentration: 10% by mass)

Wavelength conversion material 4: isobornyl acrylate dispersion of quantum dot phosphor that emits red light, having InP core and ZnS shell (Gen 3.5 QD Concentrate, Nanosys Inc., quantum dot phosphor concentration: 10% by mass)

Synthesis Example 1

To a reaction container equipped with a thermometer, a stirrer, a nitrogen-introduction tube and a vacuum plumbing, 174.0 g of pentaerythritol tetrakis(3-mercaptopropionate) (PEMP, Evans Chemetics LP) were placed, and depressurized with a vacuum pump while stirring at a rate of 200 rotations/min for 30 minutes. Thereafter, 26.0 g of tris(2-acryloyloxyethyl)isocyanurate, melted by heating at 55° C. to 65° C. (FANCRYL FA-731A, Hitachi Chemical Co., Ltd.) were added and stirred for 30 minutes. Subsequently, 0.25 g of triethylamine were added as a catalyst to cause reaction for 2 hours. After confirming the disappearance of an absorption peak corresponding to an acryloyl group by infrared spectroscopic analysis, the reaction was ended and a thioether oligomer (weight average molecular weight: 4600) was obtained.

The measurement of weight average molecular weight was performed by gel permeation chromatography with the following apparatus and conditions, and the data were converted using standard polystyrene calibration curve. The calibration curve was prepared using 5 sample set (PStQuick MP-H, PStQuick B (Tosoh Corporation)

Apparatus: high-speed GPC (HLC-8320 GPC, detector: differential refractometer, Tosoh Corporation)

Solvent: tetrahydrofuran (THF)

Column: TSKgel SuperMultipore HZ-H (Tosoh Corporation)

Column size: 15 cm (length) and 4.6 mm (inner diameter)

Measurement temperature: 40° C.

Flow rate: 0.35 mL/min

Sample concentration: 10 mg/THF 5 mL

Injection amount: 20 μL (Preparation of Wavelength Conversion Member)

The resin composition for wavelength conversion as prepared in the above process was applied on one surface of covering material A, a PET film having a thickness of 110 μm, to form a coating layer. On the coating layer, covering material B, a PET film having a thickness of 110 μm, was disposed such that the angle between the orientation direction of covering material A and the orientation direction of covering material B was the value indicated in Table 1. Subsequently, the resin composition for wavelength conversion was cured by exposing with ultraviolet ray with an ultraviolet irradiation device (Eye Graphics Co., Ltd.) at an irradiance of 1000 mJ/cm$^2$, thereby preparing a wavelength conversion member.

The water vapor transmission rate of covering materials A and B was measured at 40° C. and a relative humidity of 90% with a water vapor transmission rate measurement device (AQUATRAN, MOCON, Inc.) The result was $1 \times 10^{-1}$ g/(m$^2$·day).

The oxygen transmission rate of covering materials A and B was measured at 30° C. and a relative humidity of 70% with an oxygen transmission rate measurement device (OX-TRAN, MOCON, Inc.) The result was 1 cm$^3$ (cc)/(m$^2$·day·atm).

(Evaluation of Total Light Transmittance and Haze)

An evaluation sample was obtained by cutting the wavelength conversion member as prepared by the above process into a size of 50 mm in width and 50 mm in length.

The total light transmittance and the haze of the evaluation sample were measured by the method according to JIS K 7136:2000, using a turbidimeter (NHD-2000, Nippon Denshoku Industries. Co., Ltd.) The value of the haze was calculated by the following formula.

Haze (%)=(Td/Tt)×100

In the formula, Td refers to the diffuse transmittance and Tt refers to the total light transmittance.

(Evaluation of Adhesion)

The wavelength conversion member as prepared by the above process was cut into a size of 25 mm in width and 100 mm in length, and a peel test was performed using a tensile tester (RTC-1210, Orientec Co., Ltd.) by peeling one of the covering materials in a direction of 90° under 25° C. at a tensile rate of 300 mm/min.

(Evaluation of Curling (S-Shaped Curling))

The wavelength conversion member (700 mm×1200 mm) was placed on a flat plate, and the distances between the plate and two corners of the wavelength conversion member, positioned diagonally to each other, were measured at both sides of the wavelength conversion member. The average value of the measured values were regarded as the height of curling (mm), and the degree of curling was evaluated by the following criteria.

—Evaluation Criteria—
A: the height of curling is less than 5 mm
B: the height of curling is from 5 mm to less than 10 mm
C: the height of curling is 10 mm or more As shown in Table 1, the wavelength conversion members of the Examples, in which the angle between the orientation directions of covering materials A and B was 20° or less, exhibited favorable flatness with suppressed curling as compared with the wavelength conversion members of the Comparative Examples, in which the angle between the orientation directions of covering materials A and B was greater than 20°.

All publications, patent applications, and technical standards mentioned in this specification are herein incorporated by reference to the same extent as if each individual publication, patent application, or technical standard was specifically and individually indicated to be incorporated by reference.

EXPLANATION OF SYMBOLS

10: wavelength conversion member, 11: wavelength conversion layer, 12A: covering material, 12B: covering material, 20: backlight unit, 21: light source, 22: light guard plate, 23: retroreflection member, 24: reflection plate, 30: liquid crystal display device, 31: liquid crystal cell unit, 32: liquid crystal cell, 33A: polarization plate, 33B: polarization plate, $L_B$: blue light, $F_R$: red light, $L_G$: green light, $L_W$: white light

The invention claimed is:

1. A laminate, comprising an intermediate layer, which is a cured product obtained by exposure to an active energy ray, and a covering material A and a covering material B that are disposed on respective sides of the intermediate layer, the covering material A being disposed with an orientation direction at an angle of 20° or less with respect to an orientation direction of the covering material B.

TABLE 1

| | | Example 1 | Example 2 | Example 3 | Example 4 | Example 5 | Example 6 |
|---|---|---|---|---|---|---|---|
| Wavelength conversion layer | Thiol compound 1 | 54.0 | 54.0 | 59.0 | 64.0 | 49.0 | — |
| | Thiol compound 2 | — | — | — | — | — | 21.8 |
| | (Meth)allyl compound | 45.0 | 45.0 | 40.0 | 35.0 | 50.0 | — |
| | (Meth)acrylic compound | — | — | — | — | — | 77.0 |
| | Photopolymerization initiator 1 | 1.0 | 1.0 | 1.0 | 1.0 | 1.0 | — |
| | Photopolymerization initiator 2 | — | — | — | — | — | 0.5 |
| | White pigment | — | — | — | — | — | 0.7 |
| | Wavelength conversion material 1 | 3.5 | 3.5 | 3.5 | 3.5 | 3.5 | — |
| | Wavelength conversion material 2 | 1.5 | 1.5 | 1.5 | 1.5 | 1.5 | — |
| | Wavelength conversion material 3 | — | — | — | — | — | 2.5 |
| | Wavelength conversion material 4 | — | — | — | — | — | 2.5 |
| Covering material | Angle of orientation direction [°] | 0 | 20 | 15 | 10 | 10 | 0 |
| | Total light transmittance [%] | 66 | 66 | 65 | 64 | 68 | 63 |
| | Haze [%] | 99 | 99 | 99 | 99 | 99 | 99 |
| | Peel strength [N/25 mm] | 4.5 | 4.5 | 4.6 | 4.9 | 4.0 | 6.6 |
| | Curling [mm] | A | A | A | A | A | A |

| | | Example 7 | Example 8 | Comparative Example 1 | Comparative Example 2 |
|---|---|---|---|---|---|
| Wavelength conversion layer | Thiol compound 1 | — | — | 54.0 | 54.0 |
| | Thiol compound 2 | 19.6 | 22.2 | — | — |
| | (Meth)allyl compound | — | — | 45.0 | 45.0 |
| | (Meth)acrylic compound | 79.2 | 77.0 | — | — |
| | Photopolymerization initiator 1 | — | — | 1.0 | 1.0 |
| | Photopolymerization initiator 2 | 0.5 | 0.5 | — | — |
| | White pigment | 0.7 | 0.3 | — | — |
| | Wavelength conversion material 1 | — | — | 3.5 | 3.5 |
| | Wavelength conversion material 2 | — | — | 1.5 | 1.5 |
| | Wavelength conversion material 3 | 2.5 | — | — | — |
| | Wavelength conversion material 4 | 2.5 | 2.0 | — | — |
| Covering material | Angle of orientation direction [°] | 0 | 0 | 26 | 33 |
| | Total light transmittance [%] | 63 | 65 | 66 | 66 |
| | Haze [%] | 99 | 99 | 99 | 99 |
| | Peel strength [N/25 mm] | 6.6 | 6.9 | 4.5 | 4.5 |
| | Curling [mm] | A | A | B | C |

2. The laminate according to claim 1, wherein each of the covering material A and the covering material B has a multilayer structure.

3. The laminate according to claim 1, wherein at least one of the covering material A or the covering material B has a water vapor transmission rate, at 40° C. and a relative humidity of 90%, of $1\times10^{-1}$ g/(m$^2$·day) or less.

4. The laminate according to claim 1, wherein at least one of the covering material A or the covering material B has an oxygen transmission rate, at 30° C. and a relative humidity of 70%, of 1 cm$^3$/(m$^2$·day·atm) or less.

5. A wavelength conversion member, comprising a wavelength conversion layer, which is a cured product obtained by exposure to an active energy ray, and a covering material A and a covering material B that are disposed on respective sides of the wavelength conversion layer, the covering material A being disposed with an orientation direction at an angle of 20° or less with respect to an orientation direction of the covering material B.

6. The wavelength conversion member according to claim 5, wherein each of the covering material A and the covering material B has a multilayer structure.

7. The wavelength conversion member according to claim 5, wherein at least one of the covering material A or the covering material B has a water vapor transmission rate, at 40° C. and a relative humidity of 90%, of $1\times10^{-1}$ g/(m$^2$·day) or less.

8. The wavelength conversion member according to claim 5, wherein at least one of the covering material A or the covering material B has an oxygen transmission rate, at 30° C. and a relative humidity of 70%, of 1 cm$^3$/(m$^2$·day·atm) or less.

9. The wavelength conversion member according to claim 5, wherein the wavelength conversion layer is a cured product of a composition comprising a wavelength conversion material, a polymerizable compound and a photolymerization initiator.

10. The wavelength conversion member according to claim 9, wherein the polymerizable compound comprises a thiol compound and at least one selected from the group consisting of a (meth)allyl compound and a (meth)acrylic compound.

11. The wavelength conversion member according to claim 9, wherein the wavelength conversion material comprises a quantum dot phosphor.

12. A backlight unit, comprising the wavelength conversion member according to claim 5 and a light source.

13. An image display device, comprising the backlight unit according to claim 12.

\* \* \* \* \*